United States Patent

Doisy et al.

[11] Patent Number: 6,072,423
[45] Date of Patent: Jun. 6, 2000

[54] METHOD FOR MEASURING THE DOPPLER SHIFT IN A SENSOR SYSTEM USING AMBIGUOUS CODES

[75] Inventors: Yves Doisy, Grasse Plascassier; François Chalaron, Tourette sur Loup; Laurent Deruaz, Mouans Sartoux, all of France

[73] Assignee: Thomson Marconi Sonar S.A.S., Sophia Antipolis, France

[21] Appl. No.: 09/284,469

[22] PCT Filed: Oct. 14, 1997

[86] PCT No.: PCT/FR97/01833

§ 371 Date: Apr. 20, 1999

§ 102(e) Date: Apr. 20, 1999

[87] PCT Pub. No.: WO98/18020

PCT Pub. Date: Apr. 30, 1998

[30] Foreign Application Priority Data

Oct. 22, 1996 [FR] France .................................. 96 12803

[51] Int. Cl.⁷ ..................................................... G01S 13/50
[52] U.S. Cl. .............................. 342/104; 342/89; 342/98; 342/99; 342/189
[58] Field of Search .................................. 367/87, 89, 90, 367/99, 100, 101; 342/104, 107, 108, 114, 115, 175, 189, 192, 193, 195, 109

[56] References Cited

U.S. PATENT DOCUMENTS

| 5,212,489 | 5/1993 | Nelson ..................................... 342/109 |
| 5,212,490 | 5/1993 | Nelson et al. .......................... 342/109 |
| 5,515,055 | 5/1996 | Hollinger ................................ 342/108 |
| 5,790,475 | 8/1998 | Marmarelis et al. ................... 367/100 |

*Primary Examiner*—Bernarr E. Gregory
*Attorney, Agent, or Firm*—Oblon, Spivak, McClelland, Maier & Neustadt, P.C.

[57] ABSTRACT

The invention relates to methods which make it possible to measure the Doppler shift of the echoes of a detection system. That is, the present invention modulates the frequency of the pulses of the transmissions of this system by a pseudohyperbolic function such that a restricted number of copies of the transmission signal can be used to perform the correlation operations on reception and to have them followed by an interpolation operation.

2 Claims, 1 Drawing Sheet

METHOD FOR MEASURING THE DOPPLER SHIFT IN A SENSOR SYSTEM USING AMBIGUOUS CODES

TITLE OF THE INVENTION

BACKGROUND OF THE INVENTION

1. Field of the Invention

The present invention relates to methods for measuring the Doppler shift in a detection system, for example a radar or a sonar, using ambiguous codes (Doppler x time). More precisely, it relates to transmission codes for a type of detection system which allow fine measurement of the Doppler shift of the echoes received from a moving target, with a precision adjustable independently of the parameters pertaining to the duration T, the initial frequency f(0) and the final frequency f(T) of the pulse coded according to this system.

2. Discussion of the Background

The modulation of the pulses of a sonar or a radar with particular codes which allow the accuracy of the measurement to be improved is well known and is in particular described at length in the work by A. W. RIHACZEK, entitled "Principles of high resolution radar", published by Mc Graw-Hill, copyright 1969. It is explained therein, in particular, that the transmission codes can be classified in two categories.

Nonambiguous codes, for which the ambiguity function time x Doppler shift has, around the maximum, two main directions parallel to the time and Doppler shift axes. It is then known that, for such codes, with constant (or not significantly modulated) amplitude over the duration of the code, the Doppler tolerance is inversely proportional to the duration of the code, which prevents it from being possible to fix the transmission duration and the Doppler tolerance independently. With the transmission durations used in the sonar technique, such codes lead to a very large number of copies, of the order of 1000.

Ambiguous codes, for which the ambiguity function time x Doppler shift has a peak secant at zero with the time and Doppler axes. This peak is strictly linear in the case of the hyperbolic frequency modulation (HFM) code, which has the feature of being perfectly Doppler-tolerant. In this case, the Doppler tolerance is entirely determined by the bandwidth B of the transmitted code, and is in general insufficient for accurate Doppler measurement.

The linear frequency modulation (LFM) code also belongs to the ambiguous code class. However, once the duration T and the bandwidth B of the code are fixed, the Doppler tolerance is given by, c being the speed of sound:

$$2V_3 \approx \frac{1.5c}{BT} \qquad (1)$$

This to ace is generally too small compared with needs and entails oversizing the number of reception copies.

Another ambiguous code example is described in U.S. Pat. No. 5,481,504 granted on Jan. 2, 1996 in the name of ATLAS Electronics Gmbh. In this code, the instantaneous frequency is a function of a power of time. This power is given by a parameter which varies between 0 and 1 and, when this parameter is equal at 1, it becomes equivalent to the linear frequency modulation code. In this case, a very large number of reception copies is needed and the minimum number of copies is substantially equal to that of the LFM code.

SUMMARY OF THE INVENTION

In order to avoid these drawbacks, the invention proposes a method measuring the Doppler shift in a detection system using ambiguous codes, in which the transmission signal is formed by pulses of length T having an initial frequency f(0) and a final frequency f(T)=f(0)+B, in which along each of these pulses the instantaneous frequency f(t) varies according to a pseudohyperbolic function determined by a parameter x such that, when this parameter is zero, the function reduces to a hyperbolic function, and when this parameter is not zero it is possible, on reception of these signals, to have the correlation operations followed by an interpolation operation.

BRIEF DESCRIPTION OF THE DRAWINGS

Other features and advantages of the invention will become readily apparent from the following description, presented by way of non-limiting example with reference to the appended figure which represents a diagram making it possible to explain the parameters used in the text, wherein.

DESCRIPTION OF THE PREFERRED EMBODIMENTS

Figure 1:
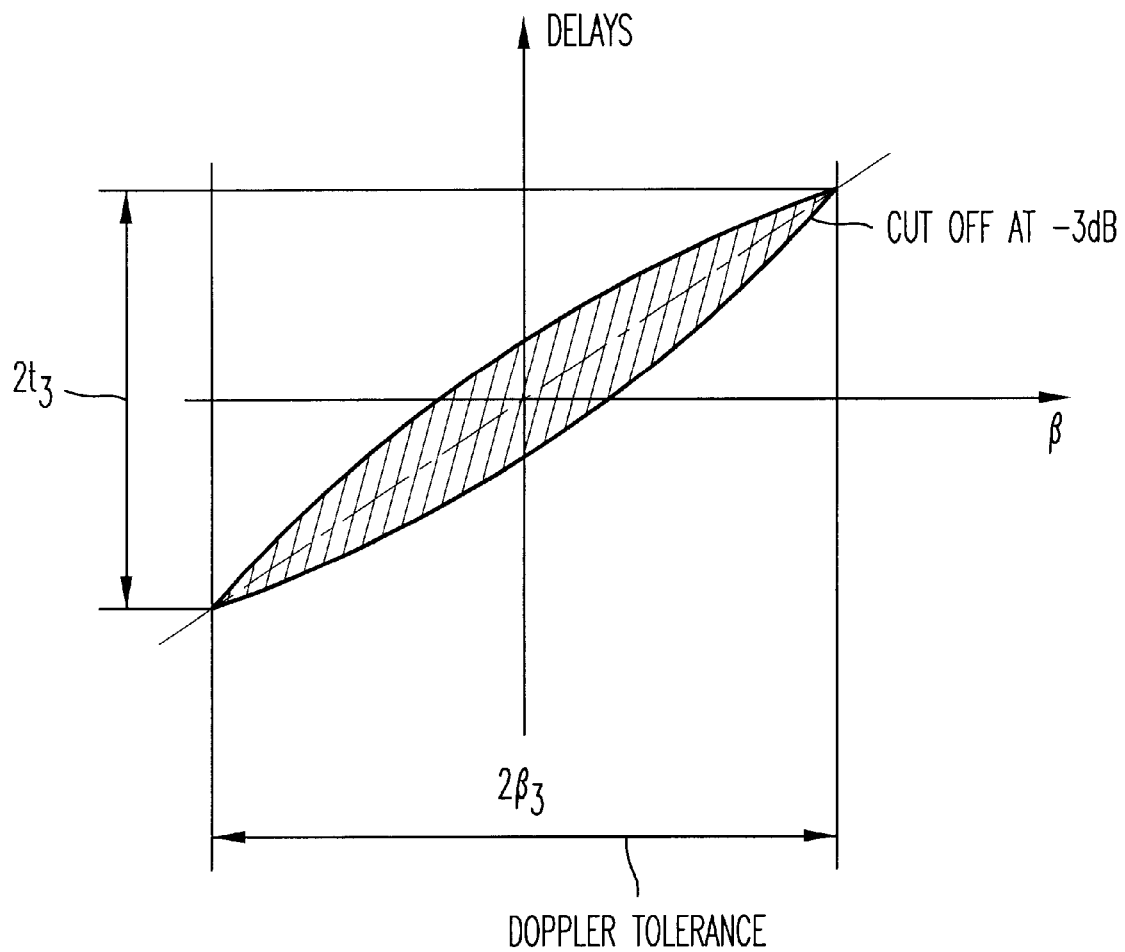
FIG. 1 represents a parameter $\beta$ representing the Doppler shift as a function of the delays of the echoes assigned to this Doppler shift.

The representative points shown in FIG. 1, chosen by cutting off at −3 dB all the signals relative to the maximum reception intensity, are distributed in an elongated ellipse which is centered on the origin of the axes and is inclined relative to them.

The parameter $\beta$ is given by the following formula, in which V is the velocity of the target giving rise to the echoes:

$$\beta = \frac{2V}{C} = \frac{f \text{ received}}{f \text{ transmitted}} - 1 \qquad (2)$$

Under these conditions the Doppler tolerance, corresponding to the abscissa range of this ellipse, is equal to $$2\beta_3 = 2\frac{2V_3}{c}$$

This Doppler tolerance corresponds to a difference over the delays equal to $2t_3$.

In order to make it possible to reduce the number of copies necessary for correctly processing the reception signals, the invention proposes to introduce an extra parameter in the code used for modulating the frequency of the transmission pulses. This extra parameter is chosen so as to make it possible to adjust the Doppler tolerance independently of B and T, and to obtain a modulation law such that:

for a particular value of the parameter, the code reduces to the HMF code, the code has a Doppler/distance ambiguity peak as linear as possible, so as to have good interpolation properties for fine measurement of the Doppler and of the time of arrival of the echo. This interpolation will be carried out on reception of the echoes after the correlation operation. This provides, depending on the signal/noise ratio of the echoes, much better measurement accuracy than the separation of the reception copies, for Doppler shift.

More particularly, the invention proposes to use the following instantaneous frequency law, where t is taken over the duration of the pulse T and where x, which is positive or negative, fixes the Doppler tolerance:

$$f(t) = f(0) \left[ \frac{A}{A + (1+x)\frac{t}{T}} \right]^{\frac{1}{1+x}} \quad (3)$$

Calculation shows that this substantially leads to:

$$V_3 = \frac{1.74c}{|x|BT} \quad (4)$$

and $$t_3 \approx T\left(|A| - \frac{x}{2}\right)\frac{3.48}{|x|BT} \quad (5)$$

Under these conditions, in order to determine the parameters x and A which fully define this frequency law, the frequency f(0), f(T), the Doppler tolerance $V_3$ and the pulse duration T are fixed, these being determined for operational reasons, and these parameters x and A are then obtained using the following formulae:

$$x = \frac{1.74}{BT\left(\frac{2V_3}{c}\right)} \quad (1)$$

$$A = \frac{(1+x)[f(T)/f(0)]^{1+x}}{1 - [f(T)/f(0)]^{1+x}} \quad (7)$$

Under these conditions, the accuracies for the measurements of the radial velocity and of the delay are given by the following formulae:

$$\sigma_V = \frac{V_3}{\sqrt{S/N}} \quad (8)$$

$$\sigma_T = \frac{t_3}{\sqrt{S/N}} \quad (9)$$

In these formulae, S/N is the signal/noise ratio of the echoes and the calculation is carried out assuming the carrier to be stationary. However, the numerical results are still valid for this carrier's normal speeds.

In a numerical application corresponding to the following values of the parameters:

f(0)=6000 Hz
f(T)=7000 Hz
T=4s $$V_3 = \pm C \times \frac{1.74}{|x|BT} = 2.5 \text{ m/s}$$

the value of the coefficient x obtained on the basis of these parameters is equal to: $|x|=0.261$.

Interpolation can then be carried out between the copies by using copies spaced by $$\delta V = \frac{2V_3}{3} = 1.67 \text{ m/s}$$

for the velocity and $$\delta T = \frac{1}{3B} = 0.33 \text{ ms}$$

for the delay. Under these conditions, considering a target for which the signal/noise ratio of the reception echoes is equal to 14 dB, the following values are obtained for the accuracies on the measurements of the radial distance and of the Doppler:

$$\sigma_T = \frac{93}{5} = 18.7 \text{ ms corresponding to 14 m}$$

$$\sigma_V = \frac{2.5}{5} = 0.5 \text{ m/s}$$

The number $n_i$ of copies is given by the formula:

$$n_i = \frac{2V_{MAX}}{\delta V} \quad (10)$$

In this formula, $V_{MAX}$ is the maximum velocity which the target can reach.

The number of copies needed in the prior art is substantially equal to that needed when using an LFM code. It is inversely proportional to $V_3$, which is obtained in this case by the formula:

$$V_3 = \frac{1.5c}{BT} \quad (11)$$

In the case of the invention, using a pseudo-HFM code, this number of copies is proportional to $V_3$, which is itself given by the formula:

$$V_3 = \frac{1.74}{0.261BT} \times C \quad (12)$$

The ratio of these two values of $V_3$ then gives the ratio of the number of copies needed between the prior art and the invention. It can be seen in the case of the numerical example described above that the invention makes it possible to use ten times fewer copies.

What is claimed is:

1. A method of determining a Doppler shift of a moving target, comprising the step of:

modulating a pulsed waveform such that along each pulse in the pulsed waveform the instantaneous frequency f(t) varies according to a function defined by the following equation:

$$f(t) = f(0) \left[ \frac{A}{A + (1+x)\frac{t}{T}} \right]^{\frac{1}{1+x}}$$

where the parameter x is never zero and is determined as a function of a chosen value of a Doppler tolerance $V_3$ by the formula:

$$x = \frac{1.74}{BT\left(\frac{2V_3}{c}\right)}$$

and the parameter A by the formula:

$$A = \frac{(1+x)[f(T)/f(0)]^{1+x}}{1-[f(T)/f(0)]^{1+x}},$$

where f(0) is an initial frequency, B is a bandwidth and f(T)=f(t)+B is a final frequency of the pulsed waveform;

transmitting the modulated pulsed waveform toward the moving object;

receiving a pulsed waveform reflected from the moving object; and correlating the received pulsed waveform with the modulated pulsed waveform so as to determine the Doppler shift of the moving target.

2. The method according to claim 1, wherein f(0)=6000 Hz, f(T)=7000 Hz, T=4s and $V_3$=2.5 m/s corresponding to x=0.261.

* * * * *